United States Patent [19]

Higashimata et al.

[11] Patent Number: 5,099,443
[45] Date of Patent: Mar. 24, 1992

[54] SYSTEM FOR CORRECTING WHEEL SPEED DATA DERIVED ON THE BASIS OF OUTPUT OF WHEEL SPEED SENSOR

[75] Inventors: Akira Higashimata; Yoshiki Yasuno, both of Kanagawa, Japan

[73] Assignee: Nissan Motor Company, Limited, Yokohama, Japan

[21] Appl. No.: 271,831

[22] Filed: Nov. 16, 1988

[30] Foreign Application Priority Data

Nov. 17, 1987 [JP] Japan .................. 62-291595

[51] Int. Cl.$^5$ ............................... B60T 8/32
[52] U.S. Cl. .................. 364/565; 364/426.02; 303/103
[58] Field of Search ........ 364/426.02, 426.03, 364/565, 566; 180/197; 303/100, 102, 103, 106

[56] References Cited

U.S. PATENT DOCUMENTS

| | | | |
|---|---|---|---|
| 4,497,026 | 1/1985 | Braschel et al. | 364/426.02 |
| 4,569,560 | 2/1986 | Kubo | 303/116 |
| 4,597,052 | 6/1986 | Matsuda | 364/550 |
| 4,637,663 | 1/1987 | Matsuda | 303/106 |
| 4,656,588 | 4/1987 | Kubo | 364/426.02 |
| 4,660,146 | 4/1987 | Kubo | 364/426.02 |
| 4,662,686 | 5/1987 | Matsuda | 303/106 |
| 4,663,715 | 5/1987 | Kubo | 364/426.02 |
| 4,663,716 | 5/1987 | Kubo | 364/426.02 |
| 4,665,491 | 5/1987 | Kubo | 364/426.02 |
| 4,667,176 | 5/1987 | Matsuda | 340/52 |
| 4,669,045 | 5/1987 | Kubo | 364/426.02 |
| 4,669,046 | 5/1987 | Kubo | 364/426.02 |
| 4,670,852 | 6/1987 | Masaki et al. | 364/426.02 |
| 4,674,049 | 6/1987 | Kubo | 364/426.02 |
| 4,674,050 | 6/1987 | Kubo | 364/426.02 |
| 4,679,146 | 7/1987 | Kubo | 364/426.02 |
| 4,680,713 | 7/1987 | Kubo | 364/426.02 |
| 4,680,714 | 7/1987 | Kubo | 364/426.02 |
| 4,682,295 | 7/1987 | Kubo | 364/426.02 |
| 4,683,537 | 7/1987 | Matsuda | 364/426.02 |
| 4,718,013 | 1/1988 | Kubo | 364/426.02 |
| 4,738,492 | 4/1988 | Matsuda | 303/106 |
| 4,760,893 | 8/1988 | Sigl et al. | 364/426.02 |
| 4,780,818 | 10/1988 | Kubo | 364/426.02 |
| 4,811,232 | 3/1989 | Hoashi et al. | 364/426.02 |

Primary Examiner—Gary Chin
Attorney, Agent, or Firm—Foley & Lardner

[57] ABSTRACT

A system for correcting a wheel speed data produced by a wheel speed sensor, employs a filter for removing noise contained in the output of the wheel speed sensor. The filter limits variation rate of the wheel speed data so as to avoid occurrence of extraordinary variation of wheel speed as influenced by error factors, such as destruction of the wheel speed sensor or noise superimposed on the output of the wheel speed sensor.

25 Claims, 4 Drawing Sheets

SYSTEM FOR CORRECTING WHEEL SPEED DATA DERIVED ON THE BASIS OF OUTPUT OF WHEEL SPEED SENSOR

BACKGROUND OF THE INVENTION

1. Field of the Invention

The present invention relates generally to a technique for precisely deriving wheel speed data which is used in an anti-skid brake control, slip control and so forth. More specifically, the invention relates to system for correcting wheel speed data which is derived on the basis of the output of a wheel speed sensor, for avoiding the influence of drop output of sensor pulse, noise superimposed on the sensor pulse and so forth.

2. Description of the Background Art

Wheel speed data is important parameter for providing accuracy in anti-skid brake control, slip control. For obtaining accurate wheel speed data, various systems have been developed and proposed.

For example, U.S. Pat. Nos. 4,674,049, 4,704,884, 4,663,715, 4,663,716, 4,660,146, 4,665,491, 4,780,818, 4,674,050, 4,680,714, 4,682,295, 4,680,713, 4,669,046, 4,669,045, 4,679,146, 4,656,588, 4,718,013, 4,569,560, 4,662,686, 4,667,176, 4,597,052, 4,730,156, 4,637,663 and 4,683,537 respectively issued on June 16, 1987, Nov. 3, 1987, May 5, 1987, May 5, 1987, Apr. 21, 1987, May 12, 1987, Oct. 25, 1988, July 14, 1987, July 21, 1987, July 14, 1987, June 16, 1987, May 26, 1987, July 7, 1987, Apr. 7, 1987, Jan. 5, 1988, Feb. 11, 1986, May 5, 1987, May 19, 1987, June 24, 1986, Mar. 8, 1988, Jan. 20, 1987 and July 28, 1987, all have been assigned to the common assignee to the present invention. In the above-identified U.S. patents, discloses anti-skid brake control system which incorporate technologies of monitoring a wheel speed by means of a wheel speed sensor. The wheel speed sensor comprises a rotor rotatable with a vehicular wheel to monitor the vehicle speed, and a sensor element, such as magnetic proximity switch, optical sensor or so forth.

The disclosed wheel speed sensor generates wheel speed indicative signal of alternating current form. The alternating frequency of the wheel speed indicative signal is variable depending upon the wheel speed. Wheel speed indicative pulse trains an generated by shaping the alternating current signal. Based on the pulse signal, wheel speed data, wheel acceleration data and so forth are derived. However, in such construction, it is possible to cause drop out of the alternating current signal due to distruction of the magnetic field in case of the magnetic proximity switch. On the other hand, it is also possible to superimpose noise on the wheel speed indicative pulse train. In such case, error in the wheel speed indicative data will cause error in anti-skid brake control or slip control.

In order to obtain higher precision in anti-skid control or slip control, it is essential to obtain precise wheel speed data which should be free from distruction of the magnetic field in the magnetic sensor or noise. However, as long as the magnetic sensor is used in monitoring the wheel speed, it is inevitable to subject destruction of the magnetic field. Also, it is not possible to avoid noise superimposed on the sensor signal.

SUMMARY OF THE INVENTION

Therefore, it is an object of the invention to provide a system for effectively correcting wheel speed indicative data produced by the wheel speed sensor for avoiding influence of error creating factors, such as destruction of the magnetic field or noise.

In order to accomplish the aforementioned and other objects, a system for correcting a wheel speed data produced by a wheel speed sensor, according to the present invention, employs a filter for removing noise contained in the output of the wheel speed sensor. The filter limits the variation rate of wheel speed data so as to avoid occurrence of extraordinary variation of wheel speed as influenced by error factors, such as destruction caused on the wheel speed sensor or noise superimposed on the output of the wheel speed sensor. According to one aspect of the invention, a system for deriving a data representative of rotation speed of a vehicular wheel, comprising:

a sensor means for monitoring wheel rotation to produce wheel speed representative data;

first means for storing wheel speed data which is derived at an immediately preceding derivation timing;

second means for periodically deriving wheel speed variation data on the basis of the wheel speed representative data at a predetermined regular timing;

third means for deriving a difference between wheel speed variations derived at current derivation timing and immediately preceding derivation timing, on the basis of the wheel speed representative data;

fourth means for setting a wheel speed variation data, the fourth means detecting the difference out of a predetermined range for modifying the wheel speed variation derived at the current derivation timing so that the difference derived with respect to the modified wheel speed variation and the wheel speed variation derived at immediately preceding derivation timing is within the predetermined range, and setting the wheel speed variation data with the modified wheel speed variation and otherwise setting the wheel speed variation derived by the second means in the current derivation timing; and fifth means for deriving the wheel speed data on the basis of the wheel speed data stored in the first means and the wheel speed variation data.

According to another aspect of the invention, a system for deriving a data representative of rotation speed of a vehicular wheel, comprising:

a sensor means for monitoring wheel rotation to produce a wheel speed representative data;

first means for storing wheel speed data which is derived at a immediately preceding derivation timing;

second means for periodically deriving wheel acceleration data on the basis of the wheel speed representative data at a predetermined regular timing;

third means for deriving a difference between wheel accelerations derived at current derivation timing and immediately preceding derivation timing, on the basis of the wheel speed representative data;

fourth means for setting a wheel acceleration data, the fourth means detecting the difference out of a predetermined range for modifying the wheel acceleration derived at the current derivation timing so that the difference derived with respect to the modified wheel acceleration and the wheel acceleration derived at immediately preceding derivation timing is within the predetermined range, and setting the wheel acceleration data with the modified wheel acceleration and otherwise setting the wheel acceleration derived by the second means in the current derivation timing; and fifth means for deriving the wheel speed data on the basis of the wheel speed data stored in the first means and the wheel acceleration data.

According to a further aspect of the invention, an anti-skid brake control system comprising:

a hydraulic braking circuit including a braking pressure generating means which generates braking pressure to be exerted on a vehicular wheel for deceleration in response to vehicular braking operation, and a pressure control means which is operable between a first mode for increasing the braking pressure and a second mode for decreasing the braking pressure;

means for deriving a data representative of rotation speed of a vehicular wheel, comprising:
   a sensor means for monitoring wheel rotation to produce a wheel speed representative data;
   first means for storing a wheel speed data which is derived at a immediately preceding derivation timing;
   second means for periodically deriving a wheel speed variation data on the basis of the wheel speed representative data at a predetermined regular timing;
   third means for deriving a difference between wheel speed variations derived at current derivation timing and immediately preceding derivation timing, on the basis of the wheel speed representative data;
   fourth means for setting wheel speed variation data, the fourth means detecting the difference out of a predetermined range for modifying the wheel speed variation derived at the current derivation timing so that the difference derived with respect to the modified wheel speed variation and the wheel speed variation derived at immediately preceding derivation timing is within the predetermined range, and setting the wheel speed variation data with the modified wheel speed variation and otherwise setting the wheel speed variation derived by the second means in the current derivation timing; and
   fifth means for deriving the wheel speed data on the basis of the wheel speed data stored in the first means and the wheel speed variation data; and controller means for deriving a wheel slippage on the basis of the wheel speed data and control signal for operating the pressure control means between the first and second modes for maintaining the wheel slippage in the vicinty of a predetermined value.

According to a still further aspect of the invention, an anti-skid brake control system comprising:

a hydraulic braking circuit including a braking pressure generating means which generates braking pressure to be exerted on a vehicular wheel for deceleration in response to vehicular braking operation, and a pressure control means which is operable between a first mode for increasing the braking pressure and a second mode for decreasing the braking pressure;

means for deriving a data representative of rotation speed of a vehicular wheel, comprising:
   a sensor means for monitoring wheel rotation to produce wheel speed representative data;
   first means for storing wheel speed data which is derived at an immediately preceding derivation timing;
   second means for periodically deriving wheel acceleration data on the basis of the wheel speed representative data at a predetermined regular timing;
   third means for deriving a difference between wheel accelerations derived at current derivation timing and immediately preceding derivation timing, on the basis of the wheel speed representative data;
   fourth means for setting a wheel acceleration data, the fourth means detecting the difference out of a predetermined range for modifying the wheel acceleration derived at the current derivation timing so that the difference derived with respect to the modified wheel acceleration and the wheel acceleration derived at immediately preceding derivation timing is within the predetermined range, and setting the wheel acceleration data with the modified wheel acceleration and otherwise setting the wheel acceleration derived by the second means in the current derivation timing; and
   fifth means for deriving the wheel speed data on the basis of the wheel speed data stored in the first means and wheel acceleration data; and controller means for deriving a wheel slippage on the basis of the wheel speed data and control signal for operating the pressure control means between the first and second modes for maintaining the wheel slippage in the vicinty of a predetermined value.

Preferably, the fifth means compares the modified wheel acceleration derived by the fourth means and the wheel acceleration derived by the second means for selecting smaller one to set as the wheel acceleration data. On the other hand, the fourth means further compares the wheel acceleration data with an acceleration limiter value, so as to further modify the wheel acceleration data by limiting the value thereof at the limiter value.

The system may further comprise sixth means for discriminating vehicular driving condition to detect a transition state between acceleration state and deceleration state, and the fourth means performs comparing operation to compare the wheel acceleration data with the acceleration limiter value when the vehicle driving condition is other than the transition state. The sixth means checks polarity of the value of the wheel acceleration for discriminating acceleration state and deceleration state. The sixth means calculate a produce of multiplication of two wheel acceleration values derived at sequence of derivation timing to check the polarity of the product to detect the transition state by detecting a negative value of the product.

DESCRIPTION OF THE PREFERRED EMBODIMENT

Figure 1:
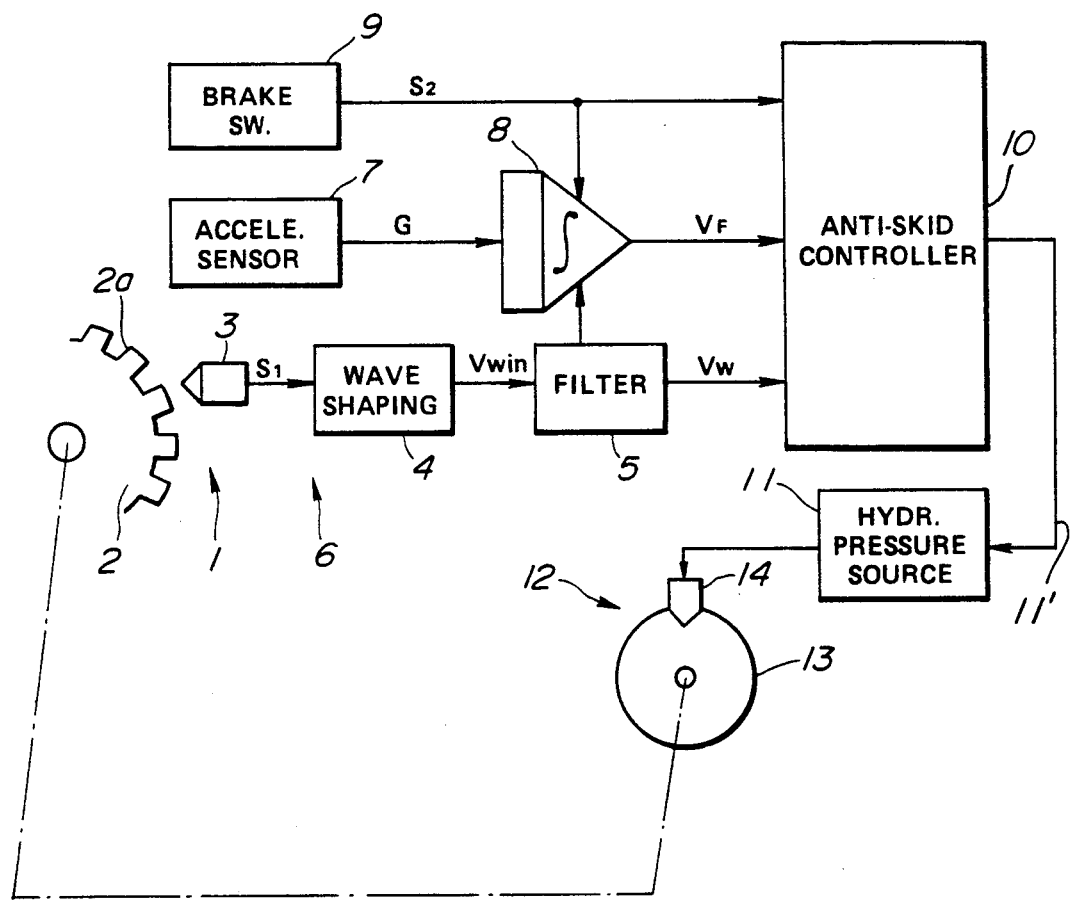
FIG. 1 is a schematic block diagram of the preferred embodiment of an anti-skid brake control system, according to the present invention.

Referring now to the drawings, particularly to FIG. 1, the preferred embodiment of an anti-skid brake control system, according to the present invention, includes a wheel speed sensor 1. In the illustrated embodiment, the wheel speed sensor 1 comprises a sensor rotor 2 which is adapted to rotate with a road wheel (not shown), and a sensor assembly 3. The sensor rotor 2 is formed with a plurality of notches 2a on periphery at regular intervals. The sensor assembly 3 is provided in the vicinity of the sensor rotor 2. The sensor assembly 3 houses a permanent magnet which forms a magnetic field around the sensor assembly. The flux of the magnetic field formed by the permanent magnet is variable depending upon the relative position of the sensor assembly 3 and the notches 2a on the periphery of the sensor rotor 2.

Since the notches 2a are arranged on the circumferential periphery of the sensor rotor 2 at regular intervals, the output voltage $S_1$ of the sensor assembly 3 becomes an alternating waveform, such as a sine wave form. The voltage signal $S_1$ of the sensor assembly 3 is input to a wave shaping circuit 4 which shapes the alternating or sine wave form voltage signal $S_1$ from the sensor assembly into a pulse train $V_{\omega in}$. The pulse train $V_{\omega in}$ has a pulse period inversely proportional to the rotation speed of the wheel. The pulse train $V_{\omega in}$ is fed to filter 5. The filter 5 filters the pulse train $V_{\omega in}$ to produce a wheel speed indicative data $V_\omega$. In practice, the filter 5 comprises a digital filter incorporated in a program. The filtering process of the digital filter will be discussed later, with a discussion of the derivation of wheel speed data.

The preferred embodiment of the anti-skid brake control system further comprises an acceleration sensor 7 and a brake switch 9. The acceleration sensor 7 monitors longitudinal acceleration exerted on the vehicle body to produce a longitudinal acceleration indicative signal G. On the other hand, the brake switch 9 turns ON in response to the application of vehicular brakes to output HIGH level braking state indicative signal $S_2$.

The longitudinal acceleration indicative signal G is input to an integrator 8. The integrator 8 is also connected to the filter 5 to receive the wheel speed indicative data $V_\omega$ and the brake switch 9 to receive therefrom the braking state indicative signal $S_2$. The integrator 8 is triggered by the HIGH level braking state indicative signal $S_2$ to latch the instantaneous wheel speed indicative data $V_\omega$ as an initial vehicle speed representative data $V_{FO}$. The integrator 8 subsequently integrates the longitudinal acceleration indicative signal G. The integrated value is added to the initial value $V_{FO}$ to derive a projected vehicle speed representative data $V_F$.

The projected vehicle speed representative data $V_F$ and the wheel speed indicative data $V_\omega$ are fed to an anti-skid controller 10. The anti-skid controller 10 further receives the braking state indicative signal $S_2$ for detecting vehicular braking state. The anti-skid controller 10 derives wheel acceleration data $a_W$ on the basis of the wheel indicative data $V_\omega$ and wheel slippage data $\lambda$ on the basis of the projected vehicle speed representative data $V_F$ and the wheel speed indicative data $V_\omega$. Based on the wheel acceleration acceleration data $a_W$ and the wheel slippage data $\lambda$, the anti-skid controller 10 performs brake control operation for maintaining the wheel slippage at an optimal level. As is well known, the vehicular braking efficiency will becomes optimum when the wheel slippage is in a range of 10% to 20%. The anti-skid controller 10 performs anti-skid brake control operation generally according to the wheel acceleration $a_W$ and the wheel slippage $\lambda$ according to the following schedule. Generally, anti-skid brake control is initiated in response to wheel deceleration (negative value of wheel acceleration) becoming greater than a predetermined deceleration threshold $-a_{ref}$. At a timing of initiation of the anti-skid brake control, the initial value of the vehicle speed representative data $V_{FO}$ is set at a value corresponding to the instantaneous wheel speed indicative data $V_\omega$. Upon initiation of the anti-skid brake control operation, the hydraulic line 11, connected between a hydraulic pressure source 11, which includes a master cylinder, (not illustrated) mechanically connected to a brake pedal, a hydraulic circuit and a pressure control valve, and a wheel cylinder 14, in which a braking pressure is generated to decelerate a wheel 13, is blocked for holding braking pressure in the wheel cylinder 14 constant. This mode of operation will be hereafter referred to as HOLD mode.

By maintaining the braking system in HOLD mode with the increased pressure, the wheel 13 further decelerates. According to deceleration of the wheel, wheel slippage $\lambda$ increases accordingly. When the wheel slippage increases across a predetermined wheel slippage threshold $\lambda_{ref}$, the pressure control valve in the hydraulic pressure source 11 is switched to drain the pressurized fluid in the wheel cylinder 14 to decrease the braking pressure. This operational state will be hereafter referred to as RELEASE mode. By decreasing the braking pressure in the wheel cylinder 14, the wheel speed is resumed toward the vehicular speed and thus the wheel slippage $\lambda$ is decreased. During this RELEASE mode operation, the wheel acceleration $a_W$ is increased across a predetermined acceleration threshold $+a_{ref}$. Then, the operation mode is again switched into the HOLD mode to maintain the braking pressure in the wheel cylinder constant. By maintaining the operation mode in the HOLD mode, the wheel speed $V_\omega$ increases across the wheel slippage threshold $\lambda_{ref}$. In response to this, the pressure control valve in the hydraulic pressure source 11 is switched the valve position into a position, in which the braking pressure is increased. This mode will be hereafter referred to as APPLICATION mode.

In the APPLICATION mode, the braking pressure in the wheel cylinder 14 is increased to decelerate the wheel. APPLICATION mode operation will be maintained until the wheel deceleration becomes greater than the deceleration threshold $-a_W$, at which next cycle of anti-skid brake control operation is to be initiated. By repeating the cycles of skid control operation set forth above, the wheel slippage $\lambda$ can be maintained at a value close to the wheel slippage threshold $\lambda_{ref}$ which is set at a target or optimum wheel slippage to obtain optimum braking efficiency.

Figure 2:
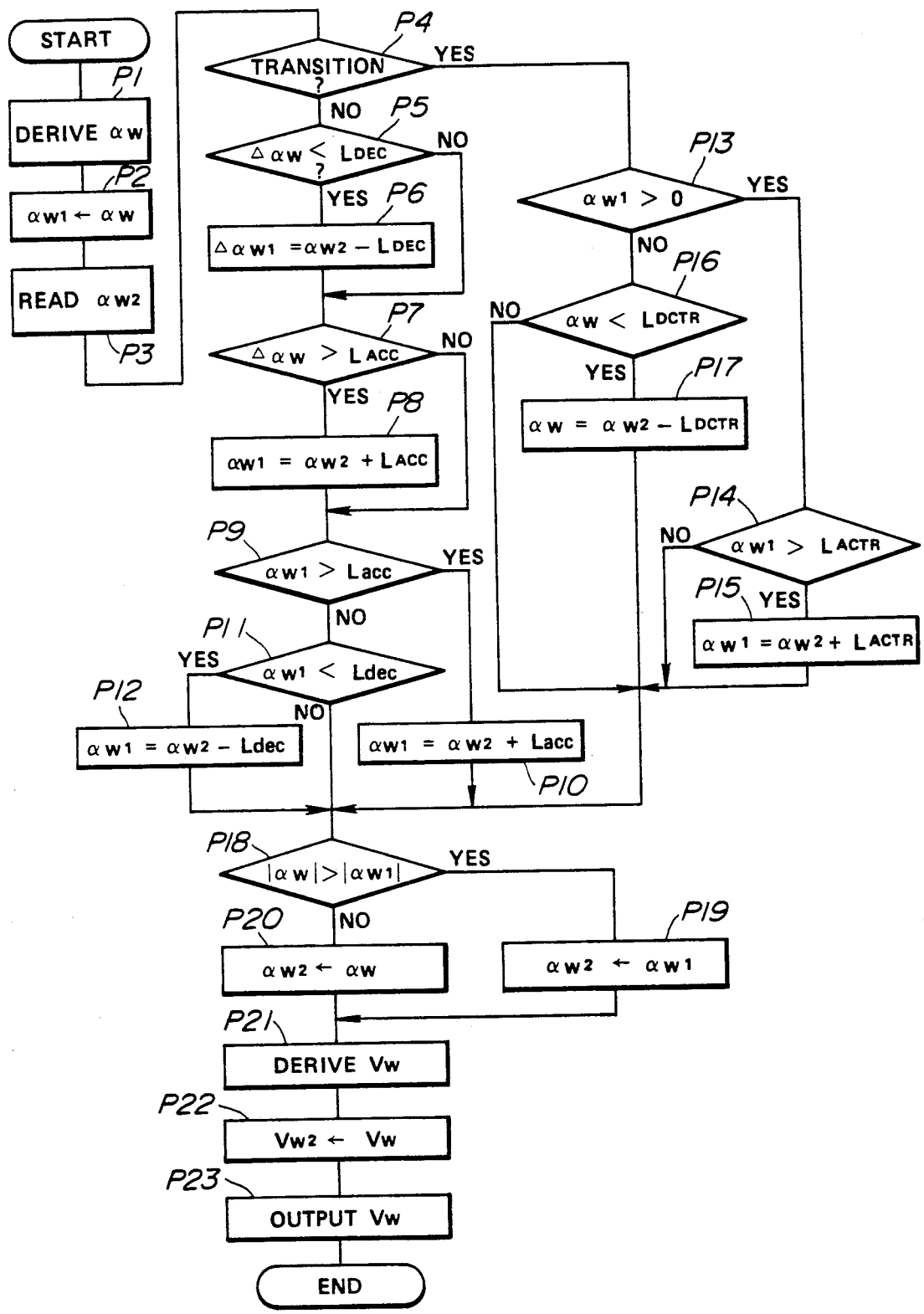
FIG. 2 is a flowchart of a wheel speed derivation routine for implementing the preferred process according to the present invention.
Figure 3:
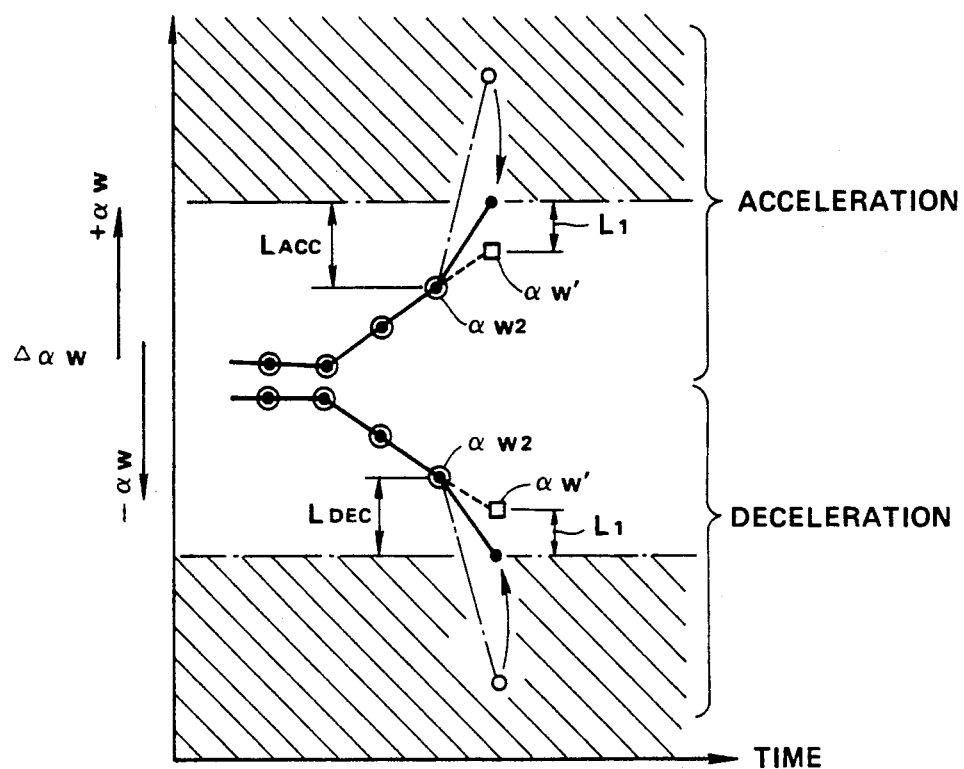
FIG. 3 is an explanatory illustration showing the manner of limiting wheel acceleration, utilizing a limit value $L_1$.

In order to perform the anti-skid brake control set forth above at a satisfactorily high precision level, it is essential to obtain accurate wheel speed indicative data $V_\omega$. Therefore, according to the shown embodiment, a routine shown in FIG. 2 is executed for correcting the wheel speed indicative data $V_\omega$ derived on the basis of the wheel sensor signal with a correction value derived on the basis of variation rate of the wheel acceleration derived on the basis of the wheel speed indicative data $V_\omega$.

The process of correcting the wheel speed indicative data $V_\omega$ will be discussed below, with reference to FIG. 2. The routine is an interrupt routine to be triggered at every given timing as governed by a main and background routine. In practice, the routine is designed to be exerted at given regular time intervals. Immediately after starting execution, the instantaneous wheel speed indicative data $V_{\omega 1}$ is read out at a step P1. At the step P1, a wheel speed indicative data $V_{\omega 2}$, the instantaneous wheel speed indicative data sampled in the immediately preceding execution cycle, is also read out. Based on the read wheel speed indicative data $V_{\omega 1}$ and $V_{\omega 2}$, a wheel speed difference data $\Delta V_\omega$ is derived by:

$$\Delta V_\omega = V_{\omega 1} - V_{\omega 2}$$

at the step P1. Then, a wheel acceleration data $\alpha_W$ is calculated based on the wheel speed difference data $\Delta V_\omega$ and the known interval of the execution cycle of this routine.

At a step P2, the wheel acceleration data $\alpha_W$ is set in a register (not shown). In practice, the register may comprise a shift register for storing fresh wheel acceleration data as "fresh wheel acceleration data $\alpha_{W1}$" with shifting the already stored fresh wheel acceleration data to a next memory address as "old wheel acceleration data $\alpha_{W2}$". The old wheel acceleration data $\alpha_{W2}$ is read out at a step P3.

Based on the fresh wheel acceleration data $\alpha_{W1}$ calculated at the step P2 and the old wheel acceleration data $\alpha_{W2}$ read out at the step P3, vehicular driving condition is discriminated at a step P4. In practice, the vehicular driving condition is discriminated by comparing the fresh wheel acceleration data $\alpha_{W1}$ and the old wheel acceleration data $\alpha_{W2}$. As will be normally appreciated, when the wheel is in deceleration, the wheel acceleration data becomes negative value, and when the wheel is in acceleration, the wheel acceleration data becomes positive value. Therefore, a product $\alpha_W^*$ obtained from multiplication of the fresh wheel acceleration data $\alpha_1$ and the old wheel acceleration data $\alpha_{W2}$ becomes positive value when the two data have the same polarity and becomes a negative value when the two data have different polarities. Therefore, when the vehicular driving condition is in transition from acceleration state to and deceleration state, or from deceleration state to acceleration state, the obtained product $\alpha_W^*$ becomes negative, and otherwise becomes positive. Consequently, at the step P4, the polarity of the product $\alpha_W^*$ as a resultant of multiplication of the fresh wheel acceleration data $\alpha_1$ and the old wheel acceleration data $\alpha_{W2}$ is checked to discriminate the vehicular driving condition.

When the product $\alpha_W^*$ is greater than zero as checked at the step S4, a wheel acceleration difference $\Delta \alpha_W$ is derived by subtracting the fresh wheel acceleration data value $\alpha_{W1}$ from the old wheel acceleration data value $\alpha_{W1}$, at a step P5. The wheel acceleration difference $\Delta \alpha_W$, is then compared with a predetermined deceleration limit value $L_{DEC}$ at a step P5 to check whether the wheel acceleration difference is smaller than the deceleration limit value $L_{DEC}$. Here, the deceleration limit value $L_{DEC}$ is set at a value corresponding to a deceleration value which cause wheel deceleration of 1 km/h in an interval between execution cycles. When the wheel acceleration difference indicative value $\Delta \alpha_W$ is smaller than the deceleration limit value $L_{DEC}$ as checked at the step p5, the fresh wheel acceleration data value $\alpha_{W1}$ is replaced with value derived from:

$$\alpha_{W1} = \alpha_{W2} - L_{DEC}$$

at a step S6. On the other hand, when the wheel acceleration difference $\Delta \alpha_W$ is greater than or equal to the deceleration limit value $L_{DEC}$ as checked at the step P5, or after modifying the fresh wheel acceleration data $\alpha_{W1}$ at the step P6, process goes to a step P7. At the step P7, the wheel acceleration difference $\Delta \alpha_W$ is compared with a predetermined acceleration limit value $L_{ACC}$. Similarly to the deceleration limit value $L_{DEC}$, the acceleration limit value $L_{ACC}$ set at a value corresponding to a acceleration value which cause wheel acceleration of 1 km/h in an interval between execution cycles. When the wheel acceleration difference $\Delta \alpha$ is greater than the acceleration limit value $L_{ACC}$, then, the fresh wheel acceleration data value $\alpha_{W1}$ is modified by $$\alpha_{W1} = \alpha_{W2} + L_{ACC}$$

at a step P8. Otherwise, process jumps the step P8.

Figure 4:
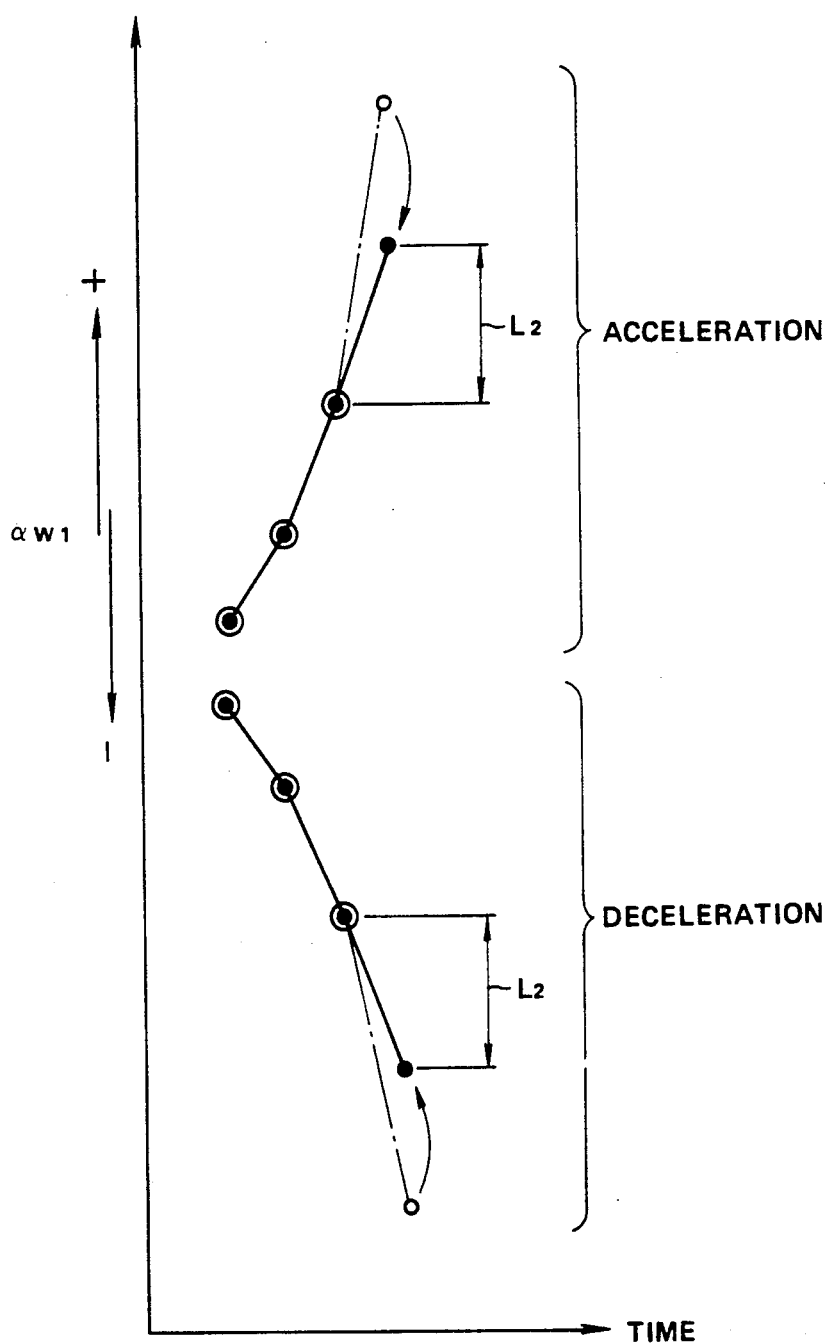
FIG. 4 is an explanatory illustration showing the manner of limiting wheel acceleration, utilizing a limit value $L_2$.

Through steps P5 to P8, significant variation of wheel acceleration in relation to the immediately preceding execution cycle can be avoided by limiting the wheel acceleration variation range, as shown in FIG. 4. Namely, as seen from FIG. 4, when the wheel acceleration varies beyond the predetermined range, which is set with respect to the preceding wheel acceleration, and, thus, falls in output within the acceptable range, the wheel acceleration is limited to the value within the acceptable range. Namely, when the wheel acceleration varies beyond the predetermined range with respect to the preceding wheel acceleration, a judgment can be made that the wheel speed data, on which the wheel acceleration is derived, contains an error caused due to distruction on the sensor output or noise superimposed on the output of the wheel speed sensor. Therefore, the variation rate of the wheel acceleration can be limited to be smaller than or equal to the limit value.

As shown in FIG. 4, the limit value $L_{DEC}$ or $L_{ACC}$ are determined by adding a predetermined value $L_1$ to a possible wheel acceleration value $\alpha_W'$ which is reached when the variation rate of wheel acceleration changed from that in the immediately preceding and two preceding execution cycles. Practically, the limit values $L_{DEC}$ and $L_{ACC}$ becomes the sum values of the possible magnitude of wheel acceleration variation $L_1'$ and the predetermined values $L_1$. Experimentarily, the limit values $L_{DEC}$ and $L_{ACC}$ are set at a value corresponding to the vehicular speed variation of 1 km/h within one execution cycle.

Figure 5:
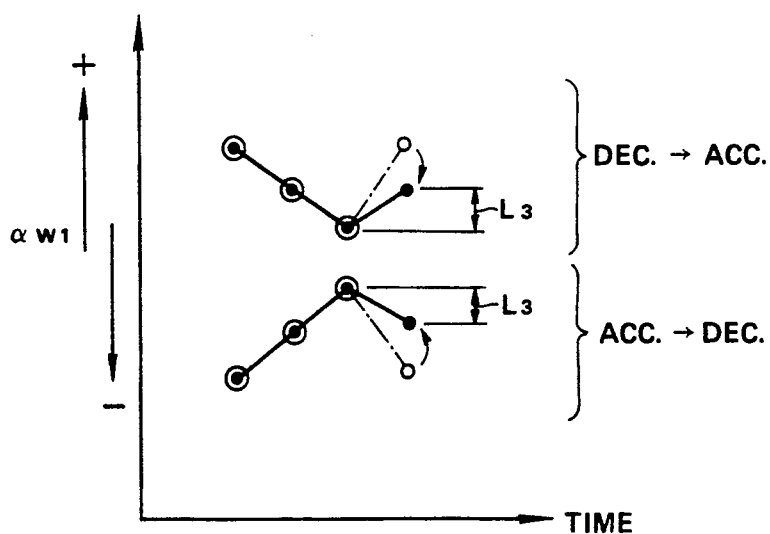
FIG. 5 is an explanatory illustration showing the manner of limiting wheel acceleration, utilizing a limit value $L_3$.

Returning to the routine of FIG. 2, when the wheel acceleration difference indicative data $\Delta \alpha_W$ is greater than or, after the process at step P8, the fresh wheel acceleration data $\alpha_{W1}$ is compared with a wheel acceleration criterion $L_{acc}$, at a step P9. The wheel acceleration criterion $L_{acc}$ is set at a value corresponding to a vehicular speed of 3.5 km/h within one execution cycle. When the fresh wheel acceleration $\alpha_{W1}$ is greater than the wheel acceleration criterion $L_{acc}$ as checked at the step P9, the fresh wheel acceleration value $\alpha_{W1}$ is limited to a value derived by:

$$\alpha_{W1} = \alpha_{W2} + L_{acc}$$

at a step P10. As shown in FIG. 5, the wheel acceleration $\alpha_W$ to be derived on the basis of the wheel speed data $V_\omega$, can be limited in variation rate to be smaller than or equal to the wheel acceleration criterion $L_{dec}$.

On the other hand, when the fresh wheel acceleration value $\alpha_{W1}$ is smaller than or equal to the wheel acceleration criterion $L_{acc}$, the fresh wheel acceleration is compared with a wheel deceleration criterion $L_{dec}$, at a step P11. The wheel deceleration criterion $L_{dec}$ is set at a value corresponding to the vehicular speed of 3.5 kh/m per cycle. When the fresh wheel acceleration value $\alpha_{W1}$ is smaller than the wheel deceleration criterion, the fresh wheel acceleration value $\alpha_{W1}$ is limited to the value derived by:

$$\alpha_{W1} = \alpha_{W2} - L_{dec}$$

at a step P12, and as shown in FIG. 5.

When the acceleration/deceleration transition state is judged by detecting the product $\alpha_W^*$ as smaller than or equal to zero, as checked at a step P4, the polarity of the fresh wheel acceleration $\alpha_{W1}$ is checked at a step P13. When, fresh wheel acceleration $\alpha_{W1}$ is positive and thus represents the wheel acceleration state, the fresh wheel acceleration $\alpha_{W1}$ is compared with a transition state acceleration limit value $L_{ACTR}$ at a step P14. The transition state acceleration limit value $L_{ACTR}$ is set at a value corresponding to vehicular speed of 1 km/h per cycle. If the fresh wheel acceleration $\alpha_{W1}$ is greater than the transition state acceleration limit value $L_{ACTR}$, the fresh wheel acceleration $\alpha_{W1}$ is modified by:

$$\alpha_{W1} = \alpha_{W2} + L_{ACTR}$$

at a step P15. On the other hand, when fresh wheel acceleration $\alpha_{W1}$ is negative and thus represents the wheel deceleration state, the fresh wheel acceleration $\alpha_{W1}$ is compared with a transition state deceleration limit value $L_{DCTR}$ at a step P16. The transition state acceleration limit value $L_{DCTR}$ is set at a value corresponding to vehicular speed of 1 km/h per cycle. If the fresh wheel acceleration $\alpha_{W1}$ is greater than the transition state deceleration limit value $L_{DCTR}$, the fresh wheel acceleration $\alpha_{W1}$ is modified by:

$$\alpha_{W1} = \alpha_{W2} - L_{DCTR}$$

at a step P17. By the process through the steps P13 to P17, the fresh wheel acceleration $\alpha_{W1}$ can be modified within a predetermined range as defined by the transition state acceleration and deceleration limit values $L_{ACTR}$ or $L_{DCTR}$, as shown in FIG. 6.

At a step P18, an absolute value of the modified fresh wheel acceleration value $\alpha_{W1}$ derived through the steps P4 to P17, is compared with an absolute value of the wheel acceleration value $\alpha_W$ derived at the step P1. When fresh wheel acceleration value $\alpha_{W1}$ is smaller than the wheel acceleration value $\alpha_W$, the old wheel acceleration value is updated by the fresh wheel acceleration at a step P19. On the other hand, when the wheel acceleration $\alpha_W$ is smaller than the fresh wheel acceleration $\alpha_{W1}$ as checked at the step P18, the old wheel acceleration value $\alpha_{W2}$ is updated by the wheel acceleration $\alpha_W$ at a step P20.

Then, a wheel speed data $V_\omega$ is derived on the basis of the old wheel acceleration $\alpha_{W2}$ set through the steps P18 to S20 and the wheel speed data $V_{\omega 2}$ in the immediate preceding cycle by the following equation:

$$V_\omega = V_{\omega 2} + \alpha_{W2} \times t$$

where $t$ is a known execution cycle interval, at a step P21. Thereafter, the wheel speed data $V_\omega$ of the immediate preceding cycle is shifted as the old wheel speed data $V_{\omega 2}$ at a step P22. Thereafter, the wheel speed data $V_\omega$ is output at a step P23.

As will be appreciated herefrom, by limiting the variation range of wheel acceleration during execution cycle intervals, extraordinary accuracy can be obtained while successfully avoiding destruction of the magnetic field in the wheel speed sensor and noise to be superimposed on the output of the wheel speed sensor. Therefore, accurate control, such as anti-skid brake control, can be performed.

While the present invention has been disclosed in detail in terms of the preferred embodiment of the invention, the invention should not be limited to the specific embodiment set forth above and can be implemented in any ways which can be embodied without departing from the principle of the invention which is set out in the appended claims. Therefore, the invention should be understood to include all of the possible embodiments and modifications of the shown embodiment which can be implemented without departing from the principle of the invention.

For example, though the shown embodiment provides limitation of wheel acceleration for avoiding an error component in the wheel speed data, it may be possible to obtain the same or equivalent result by limiting the difference between the instantaneous wheel speed data and the wheel speed data in the immediately preceding execution cycle. Furthermore, though the shown embodiment is directed to the specific construction of the anti-skid brake control system, the process of deriving the wheel speed data is applicable for any of the anti-skid brake control system, such as those disclosed in the following U.S. Pat. Nos. 4,674,049, 4,704,884, 4,663,715, 4,663,716, 4,660,146, 4,665,491, 4,780,818, 4,674,050, 4,680,714, 4,682,295, 4,680,713, 4,669,046, 4,669,045, 4,679,146, 4,656,588, 4,718,013, 4,569,560, 4,662,686, 4,667,176, 4,597,052, 4,730,156, 4,637,663 and 4,683,537. These U.S. patents have been assigned to the common assignee to the present invention. The disclosure of the above-identified U.S. patents will be herein incorporated by reference in the disclosure. In addition, the wheel speed data derived through the preferred process with avoiding error components, can be utilized not only for anti-skid brake control, but also for slip control, which controls delivery of driving torque to driving wheel for avoiding wheel spinning.

What is claimed is:

1. A system for deriving data representative of a rotation speed of a vehicular wheel, comprising:
    a sensor means for monitoring the wheel rotation, to produce wheel speed representative data;
    first means for storing wheel speed representative data which is derived from an immediately preceding derivation timing;
    second means for periodically deriving wheel speed variation on the basis of said wheel speed representative data stored in said first means and monitored and produced by the sensor means at predetermined regular times;
    third means for deriving a difference between wheel speed variations derived from a current derivation timing and an immediately preceding derivation timing, on the basis of said wheel speed representative data stored in said first means and monitored and produced by the sensor means;

fourth means for detecting whether said difference is outside of a predetermined range, for modifying said wheel speed variation derived from the current derivation timing on the basis of the detection result, so that the difference derived with respect to the modified wheel speed variation and said wheel speed variation derived from the current derivation timing is within said predetermined range, and for replacing said wheel speed variation with the modified wheel speed variation and otherwise replacing it with said wheel speed variation derived by said second means for the current derivation timing; and fifth means for deriving said wheel rotation speed data on the basis of said wheel speed data stored in said first means and said replaced wheel speed variation derived from said fourth means.

2. A system as set forth in claim 1, wherein said fifth means compares said modified wheel speed variation derived by said fourth means and said wheel speed variation derived by said second means for selecting a smaller one to replace said wheel speed variation.

3. A system as set forth in claim 1, wherein said fourth means further compares said wheel speed variation with an acceleration limiter value so as to further modify said wheel speed variation by limiting the value thereof at said limiter value.

4. A system as set forth in claim 3, which further comprises a sixth means for discriminating a vehicular driving condition to detect a transition state between acceleration state and deceleration state, and said fourth means performs comparing operation to compare said wheel speed variation with said acceleration limiter value when the vehicle driving condition is other than said transition state.

5. A system as set forth in claim 4, wherein said sixth means checks a polarity of the value of said wheel speed variation for discriminating between said acceleration state and deceleration state.

6. A system as set forth in claim 5, wherein said sixth means calculates the product of two wheel speed variation values derived from a sequence of derivation timings to check the polarity of said product, thereby to detect said transition state by detecting negative value of said product.

7. A system for deriving data representative of a rotation speed of a vehicular wheel, comprising:
a sensor means for monitoring wheel rotation to produce wheel speed representative data;
a first means for storing wheel speed representative data which is derived from an immediately preceding derivation timing;
second means for cyclically deriving wheel acceleration data on the basis of said wheel speed representative data stored in said first means and monitored and produced by the sensor means;
third means for deriving a difference between wheel accelerations derived from a current derivation timing and from an immediately preceding derivation timing, on the basis of said wheel speed representative data stored in said first means and monitored and produced by the sensor means;
fourth means for detecting whether said difference is outside of a predetermined range, for modifying said wheel acceleration derived from a current derivation timing on the basis of the detection result, so that the difference derived with respect to the modified wheel acceleration and said wheel acceleration derived from the immediately preceding deriving timing is within said predetermined range, and for replacing said wheel acceleration, with the modified wheel acceleration and otherwise replacing it with said wheel acceleration derived by said second means in the current derivation timing; and fifth means for deriving said wheel rotation speed data on the basis of said wheel speed data stored in said first means and said replaced wheel acceleration derived by said fourth means.

8. A system as set forth in claim 7, wherein said fifth means compares said modified wheel acceleration derived by said fourth means and said wheel acceleration derived by said second means, for selecting a smaller one to replace said wheel acceleration.

9. A system as set forth in claim 7, wherein said fourth means further compares said wheel acceleration with an acceleration limiter value, so as to further modify said wheel acceleration by limiting the value thereof at said limiter value.

10. A system as set forth in claim 9, which further comprises sixth means for discriminating a vehicular driving condition to detect a transition state between an acceleration state and a deceleration state, and said fourth means performs a comparing operation to compare said wheel acceleration with said acceleration limiter value when the vehicle driving condition is in other than said transition state.

11. A system as set forth in claim 10, wherein said sixth means checks a polarity of said wheel acceleration for discriminating said acceleration state and said deceleration state.

12. A system as set forth in claim 11, wherein said sixth means calculates a product of two wheel accelerations derived from the sequence of derivation timings to check a polarity of said product, thereby to detect said transition state by detecting a negative value of said product.

13. An anti-skid brake control system comprising:
a hydraulic braking circuit including a braking pressure generating means which generates braking pressure to be exerted on a vehicular wheel for deceleration in response to vehicular braking operation, and a pressure control means which is operable between a first mode for increasing said braking pressure and a second mode for decreasing said braking pressure;
means for deriving data representative of a rotation speed of a vehicular wheel, comprising:
a sensor means for monitoring wheel rotation to produce a wheel speed representative data;
first means for storing a wheel speed data which is derived from an immediately preceding derivation timing;
second means for periodically deriving wheel speed variation on the basis of said wheel speed representative data stored in said first means and monitored and produced by the sensor means at predetermined regular timings;
third means for deriving a difference between wheel speed variations derived from a current derivation timing and immediately preceding derivation timing, on the basis of said wheel speed representative data stored in said first means and monitored and produced by the sensor means;

fourth means for detecting whether said difference is outside of a predetermined range for modifying said wheel speed variation derived from the current derivation timing on the basis of the detection result so that the difference derived with respect to the modified wheel speed variation and said wheel speed variation derived from the immediately preceding derivation timing is within said predetermined range, and for replacing said wheel speed variation with said modified wheel speed variation and otherwise replacing it with said wheel speed variation derived by said second means in the current derivation timing; and fifth means for deriving said wheel speed rotation data on the basis of said wheel speed data stored in said first means and said replaced wheel speed variation; and a controller means for deriving wheel slippage on the basis of said wheel rotation speed data; and a control signal for operating said pressure control means between said first and second modes for maintaining said wheel slippage in the vicinity of a predetermined value.

14. A system as set forth in claim 13, wherein said fifth means compares said modified wheel speed variation derived by said fourth means and said wheel speed variation derived by said second means, for selecting a smaller one to replace said wheel speed variation.

15. A system as set forth in claim 13, wherein said fourth means further compares said wheel speed variation with an acceleration limiter value, so as to further modify said wheel speed variation by limiting the value thereof to that of said limiter value.

16. A system as set forth in claim 15, which further comprises sixth means for discriminating a vehicular driving condition to detect a transition state between an acceleration state and a deceleration state, and said fourth means performs a comparing operation to compare said wheel speed variation with said acceleration limiter value when the vehicle driving condition is other than said transition state.

17. A system as set forth in claim 16, wherein said sixth means checks a polarity of said wheel speed variation for discriminating the acceleration state and the deceleration state.

18. A system as set forth in claim 17, wherein said sixth means calculates a product of two wheel speed variation values derived from a sequence of derivation timings to check a polarity of said product, thereby to detect said transition state by detecting a negative value of said product.

19. An anti-skid brake control system comprising:
a hydraulic braking circuit including a braking pressure generating means which generates braking pressure on a vehicular wheel for deceleration in response to a vehicular braking operation, and a pressure control means which is operable between a first mode for increasing said braking pressure and a second mode for decreasing said braking pressure;
means for deriving data representative of a rotation speed of a vehicular wheel, comprising:
a sensor means for monitoring wheel rotation to produce wheel speed representative data;

first means for storing wheel speed representative data which is derived from an immediately preceding derivation timing;

second means for periodically deriving wheel acceleration data on the basis of said wheel speed representative data stored in said first means and monitored and produced by the sensor means from a predetermined regular timing;

third means for deriving a difference between wheel accelerations derived from a current derivation timing and an immediately preceding derivation timing, on the basis of said wheel speed representative data stored in said first means and monitored and produced by the sensor means;

fourth means for detecting whether said difference is outside of a predetermined range for modifying said wheel acceleration derived from the current derivation timing on the basis of the detection result, so that the difference derived with respect to the modified wheel acceleration and said wheel acceleration derived from the immediately preceding derivation timing is within said predetermined range, and replacing said wheel acceleration with said modified wheel acceleration and otherwise replacing it with said wheel acceleration derived by said second means in the current derivation timing; and fifth means for deriving said wheel rotation speed data on the basis of said wheel speed data stored in said first means and said replaced wheel acceleration; and controller means for deriving a wheel slippage on the basis of said wheel speed data and a control signal for operating said pressure control means between said first and second modes for maintaining said wheel slippage in the vicinity of a predetermined value.

20. A system as set forth in claim 19, wherein said fifth means compares said modified wheel acceleration derived by said fourth means and said wheel acceleration derived by said second means, for selecting a smaller one to replace said wheel acceleration.

21. A system as set forth in claim 19, wherein said fourth means further compares said wheel acceleration with an acceleration limiter value, so as to further modify said wheel acceleration by limiting the value thereof at said limiter value.

22. A system as set forth in claim 21, which further comprises a sixth means for discriminating a vehicular driving condition to detect a transition state between an acceleration state and a deceleration state, and said fourth means performs a comparing operation to compare said wheel acceleration with said acceleration limiter value when the vehicle driving condition is other than in said transition state.

23. A system as set forth in claim 22, wherein said sixth means checks a polarity of said wheel acceleration for discriminating the acceleration state and the deceleration state.

24. A system as set forth in claim 23, wherein said sixth means calculates a product of two wheel acceleration values derived from a sequence of derivation timings to check a polarity of said product, thereby to detect said transition state by detecting a negative value of said product.

25. A system for deriving data representative of a rotation speed of a vehicular wheel, comprising:

a sensor means for monitoring wheel rotation to produce wheel speed representative data;

a first means for storing wheel speed data which is derived from an immediately preceding derivation timing;

second means for cyclically deriving wheel acceleration data on the basis of said wheel speed representative data stored in said first means and monitored and produced by the sensor means;

third means for deriving a difference between wheel accelerations from current derivation timings and an immediately preceding derivation timing, on the basis of said wheel speed representative data stored in said first means and monitored and produced by the sensor means;

fourth means for comparing said difference with a predetermined value, said fourth means setting said wheel acceleration derived in the current derivation timing when said difference is smaller than or equal to said predetermined value and otherwise modifying said wheel speed representative data so that said difference derived with said modified wheel speed representative data becomes smaller than or equal to said predetermined value; and fifth means for deriving said wheel rotation speed on the basis of said wheel speed data stored in said first means and said wheel acceleration derived from said fourth means.

* * * * *